United States Patent [19]

Hirota

[11] Patent Number: 5,253,083
[45] Date of Patent: Oct. 12, 1993

[54] IMAGE READING APPARATUS HAVING IMPROVED SHADING CORRECTION

[75] Inventor: Yoshihiko Hirota, Toyokawa, Japan

[73] Assignee: Minolta Camera Kabushiki Kaisha, Osaka, Japan

[21] Appl. No.: 758,553

[22] Filed: Sep. 12, 1991

[30] Foreign Application Priority Data

Sep. 28, 1990 [JP] Japan .................... 2-262911

[51] Int. Cl.⁵ .................................................. H04N 1/40
[52] U.S. Cl. .................................. 358/461; 358/475; 358/474
[58] Field of Search ............... 358/461, 456, 443, 448, 358/75, 80, 455, 458, 474, 475

[56] References Cited

U.S. PATENT DOCUMENTS

| | | | |
|---|---|---|---|
| 4,691,365 | 9/1987 | Nagashima | 382/54 |
| 4,806,780 | 2/1989 | Yamamoto et al. | 358/461 |
| 4,987,485 | 1/1991 | Hirota | 358/80 |

FOREIGN PATENT DOCUMENTS

| | | | |
|---|---|---|---|
| 3420359 | 12/1984 | Fed. Rep. of Germany. | |
| 0073572 | 12/1983 | Japan | 358/461 |
| 2-2348 | 1/1990 | Japan. | |

Primary Examiner—Edward L. Coles, Sr.
Assistant Examiner—Jerome Grant, II
Attorney, Agent, or Firm—Burns, Doane, Swecker & Mathis

[57] ABSTRACT

An image reading apparatus according to the present invention includes: an image reading apparatus including a plurality of image reading elements; a reference image reading apparatus for reading a reference image by using the image reading apparatus; a smoothing apparatus for smoothing reference image data read by the reference image reading apparatus; an original image reading apparatus for reading an original image by using the image reading apparatus; and an original data correcting apparatus for correcting original data read by the original image reading apparatus on the basis of the smoothed reference image data.

3 Claims, 7 Drawing Sheets

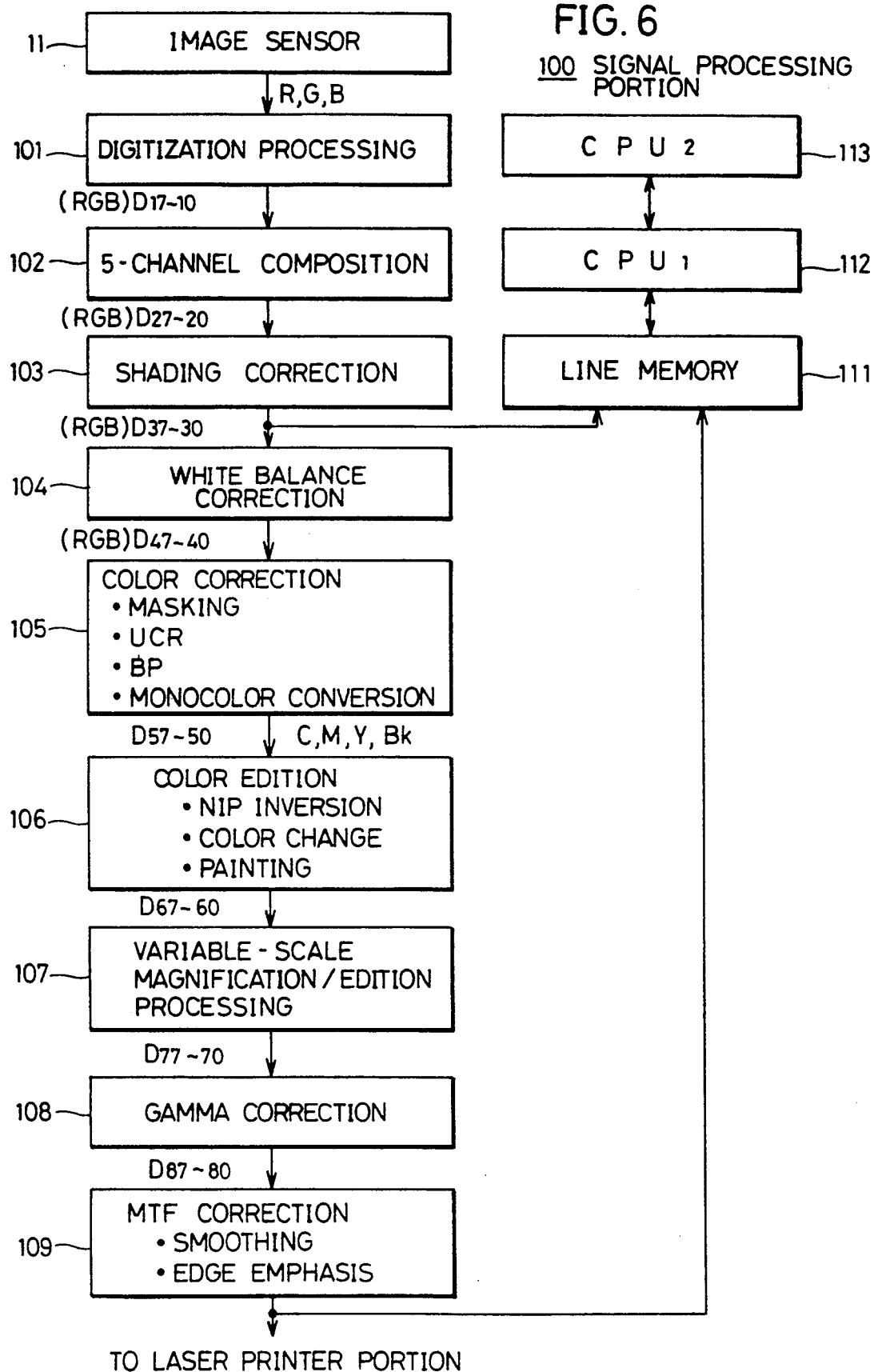

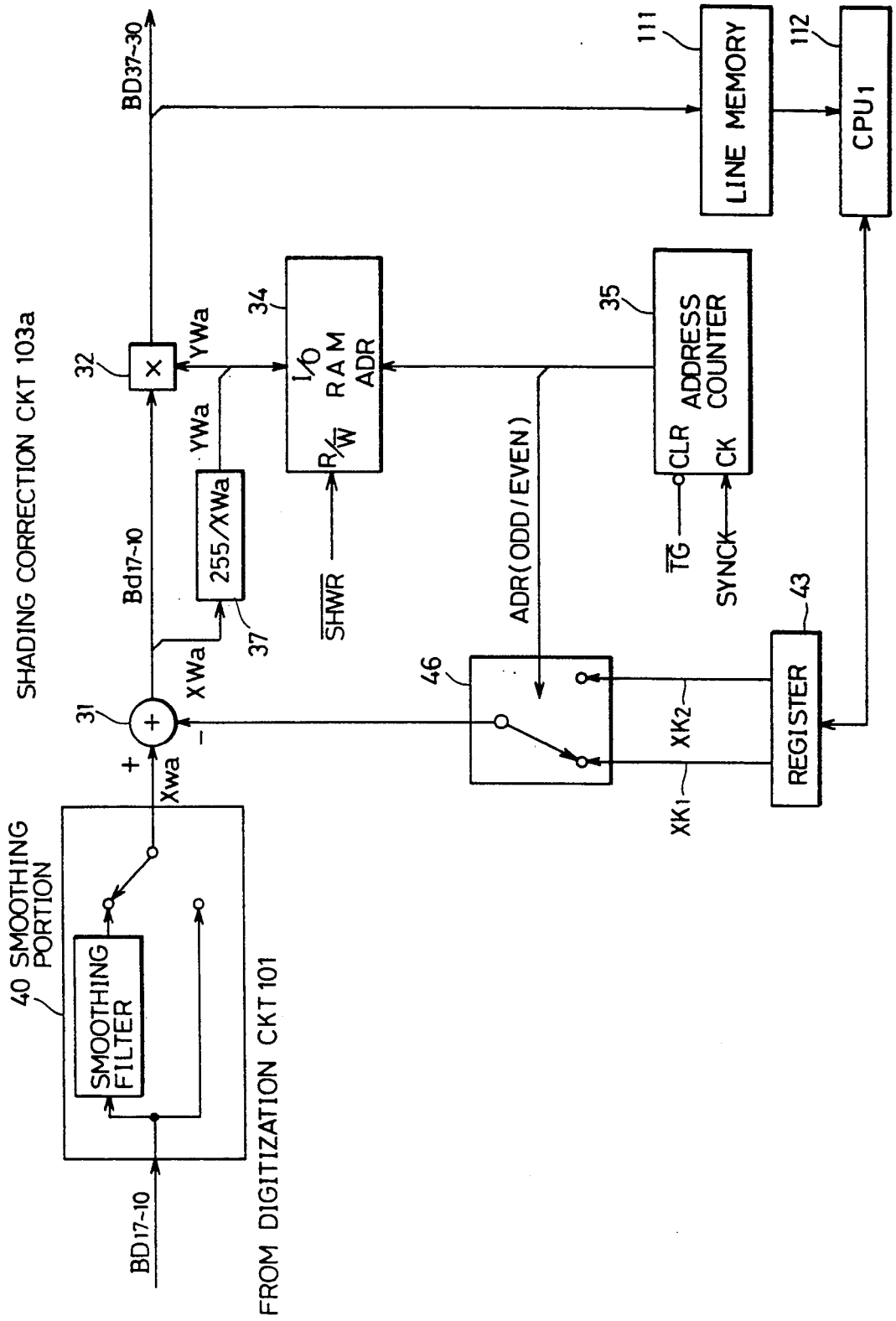

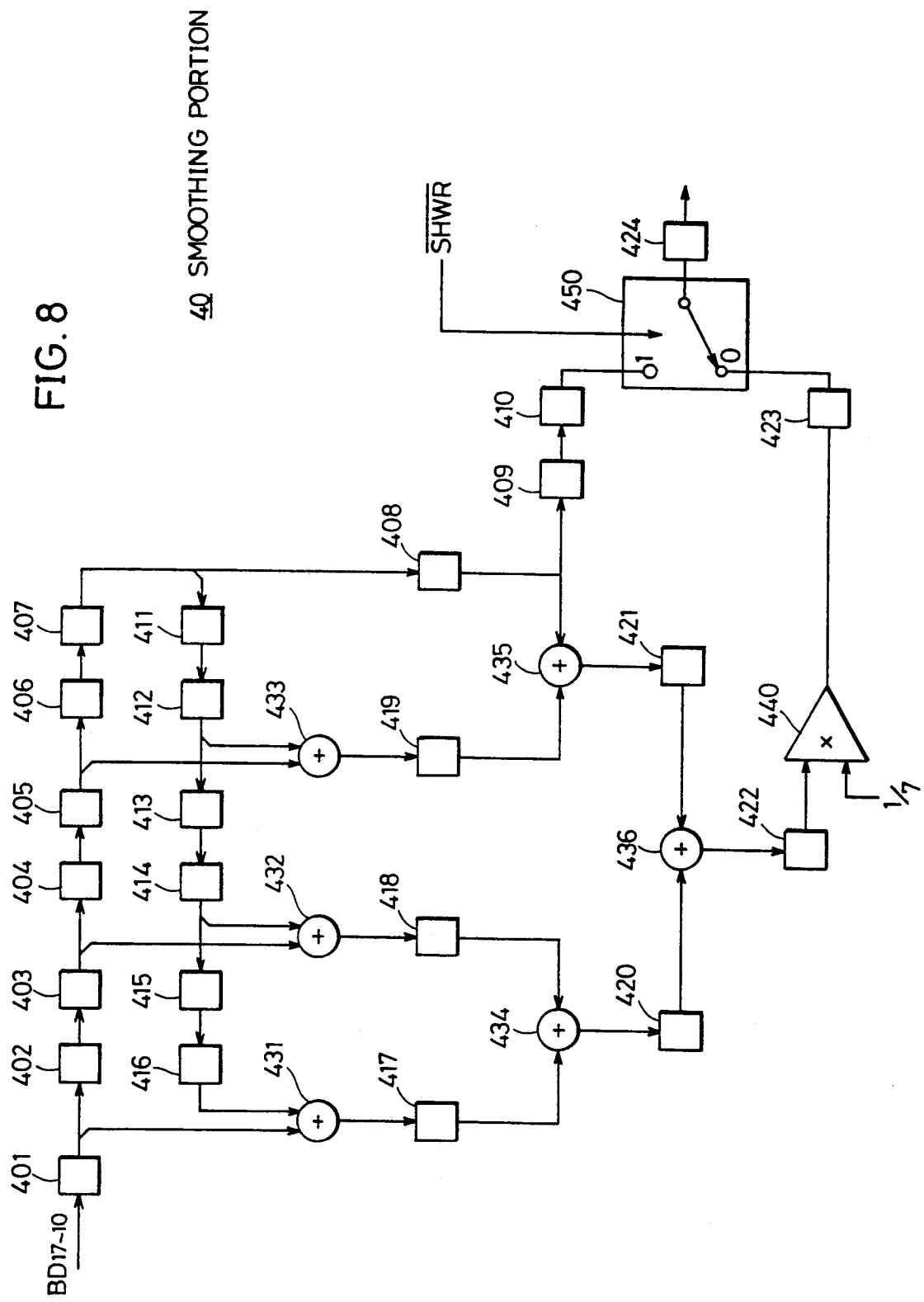

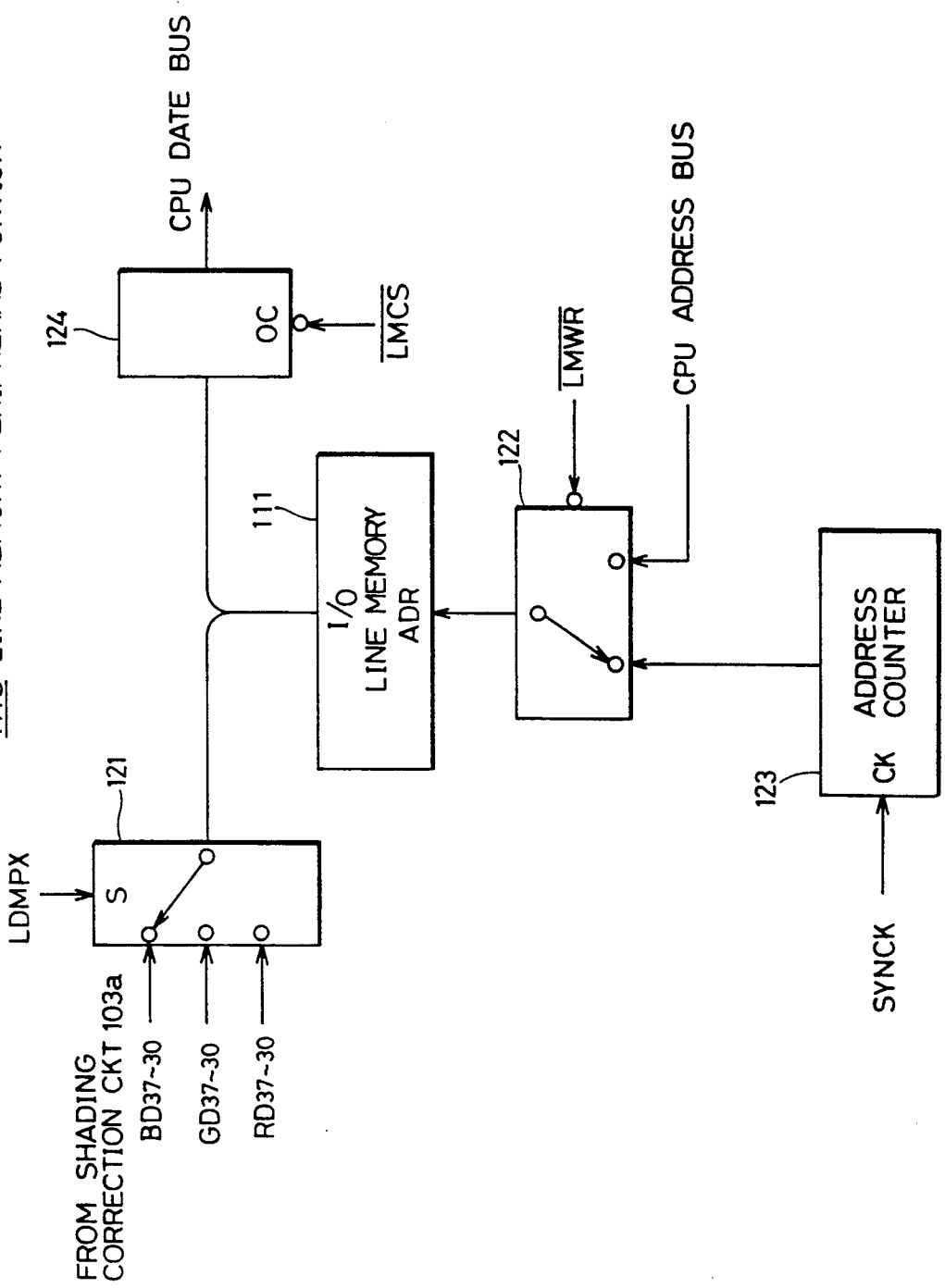

IMAGE READING APPARATUS HAVING IMPROVED SHADING CORRECTION

BACKGROUND OF THE INVENTION

1. Field of the Invention

The present invention relates generally to image reading apparatuses and, more particularly, to an image reading apparatus having improved shading correction.

2. Description of the Related Art

As image input means of computer or original image reading means of digital copiers or facsimile devices, image reading apparatus has conventionally been used which reads a still image of an original by an image sensor, then subjects resultant image data to various image processings and outputs an image signal.

An optical system of such an image reading apparatus includes below a platen glass a light source for illumination, a lens array for converging reflected light from the original, and a one-dimensional image sensor (line sensor) including solid image sensing elements formed of CCDs (charge-coupled devices) or the like, arranged in a main scanning direction (a lateral direction). Moving the line sensor in a sub-scanning direction (a longitudinal direction) causes an original image to be fractionized into pixels and then read.

A photoelectric conversion signal output from the line sensor is quantized and converted into image data of, e.g., 8 bits (256 gradations) by analog/digital conversion means. After that, the image data is subjected to various image processings, so that an image signal to be transmitted to an image forming apparatus such as a printer is generated.

In image reading apparatus, uniforming of image data (level matching) called a shading correction is carried out in order to correct dispersion of image data due to differences in sensitivity between any image sensing elements of the line sensor, light intensity distribution (unevenness in quantity of light) of the light source in the main scanning direction, distortion of lens or the like.

That is, a reference image of uniform density is read prior to reading of the original, and reference image data corresponding to pixels of one line or correction data corresponding thereto is stored. In reading of the original image, image data of each line is corrected for each pixel by repetitively using the reference image data of one line or the correction data for each line.

Conventionally, when suddenly produced external noise such as switching noise of a power source or crosstalk noise produced between any signal transmission paths is superimposed on a photoelectric conversion signal, reference image data corresponding to unspecified pixels (normally one or two pixels) in a single line becomes abnormal data. Then, image data is corrected in accordance with the reference image data including the abnormal data.

Thus, when the original image is reproduced by an output of the image reading apparatus (image data provided after the shading correction), abnormal data portion appears in the form of striped image noise in the subscanning direction, resulting in a degradation in quality of an image.

SUMMARY OF THE INVENTION

One object of the present invention is to improve the quality of a read image in an image forming apparatus.

Another object of the present invention is to reduce noise in an image forming apparatus.

A further object of the present invention is to reduce a cost in an image forming apparatus.

In order to accomplish the foregoing objects, an image forming apparatus according to one aspect of the present invention includes: image reading means formed of a plurality of image reading elements; reference image reading means for reading a reference image by using the image reading means; smoothing means for smoothing reference image data read by the reference image reading means; original image reading means for reading an original image by using the image reading means; and original data correcting means for correcting original data read by the original image reading means on the basis of the smoothed reference image data.

In the image forming apparatus thus structured, an image quality improves since the read original data is corrected on the basis of the smoothed reference image data.

In order to accomplish the foregoing objects, an image forming apparatus according to another aspect of the present invention includes: image reading means formed of a plurality of image reading elements; switching means for switching between a first path for subjecting data read by the image reading means to a smoothing processing and a second path for not subjecting the data read by the image reading means to the smoothing processing, to transmit the data; first control means when reading a reference image by using the image reading means, for switching the path to the first path by the switching means, so as to subject read reference image data to a smoothing processing; storage means for storing the reference image data subjected to the smoothing processing by the first control means; second control means when reading an original image by using the image reading means, for switching the path to the second path by the switching means, so as not to subject read original image data to the smoothing processing; and original data correcting means for correcting the original data not subjected to the smoothing processing on the basis of the reference image data stored in the storage means.

In the image forming apparatus thus structured, efficient reading is possible since the switching of the path is made in accordance with the read image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a block diagram of a signal processing portion according to one embodiment of the present invention.

FIG. 7 is a block diagram of a shading correction circuit according to another embodiment of the present invention.

FIG. 8 is a circuit diagram of a smoothing portion of FIG. 7.

FIG. 9 is a block diagram of a peripheral portion of a line memory according to still another embodiment of the present invention.

DESCRIPTION OF THE PREFERRED EMBODIMENTS

One embodiment of the present invention will now be described with reference to the drawings.

Figure 3:
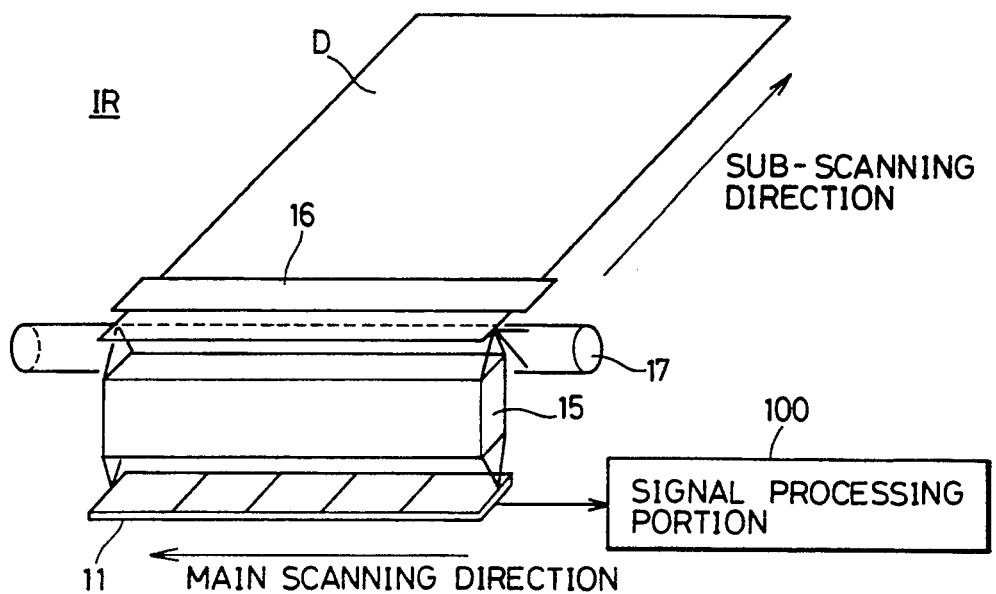
FIG. 3 is a perspective view schematically showing a major part of an image reader portion according to one embodiment of the present invention.
Figure 4:
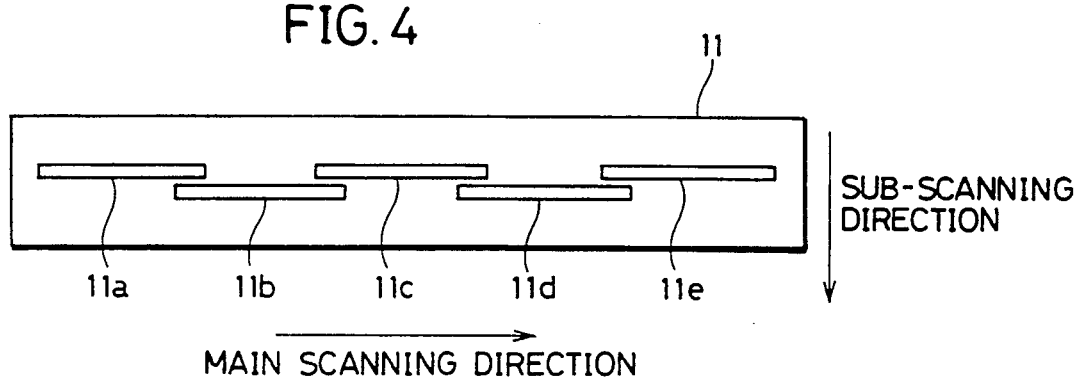
FIG. 4 is a plan view of an image sensor of FIG. 3.
Figure 5:
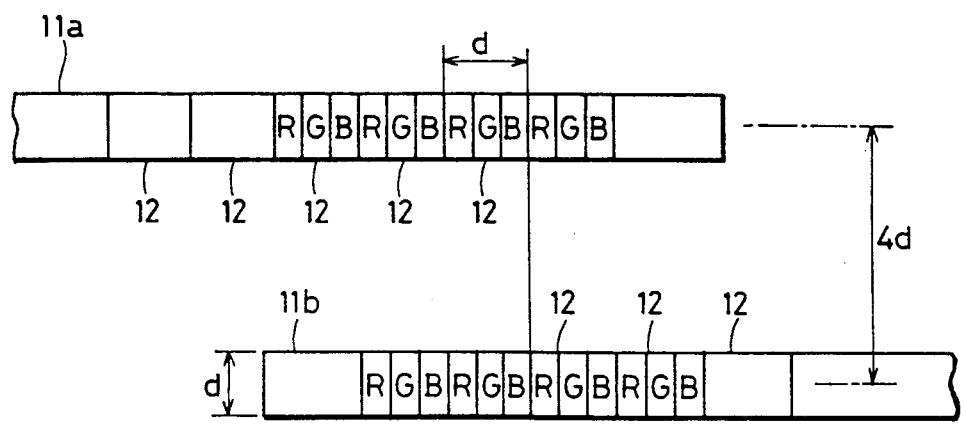
FIG. 5 is an enlarged view of CCD sensor chips of FIG. 4.

FIG. 3 is a perspective view schematically showing a major part of an image reader portion IR in accordance with the present invention; FIG. 4 is a plan view of an image sensor 11; and FIG. 5 is an enlarged view of CCD sensor chips 11a and 11b of FIG. 4.

Image reader portion IR is incorporated as means for reading an original D into a digital copier. A color copied image of an original image is formed in a laser printer portion (not shown) based on an output of image reader portion IR.

Referring to FIG. 3, original D placed on a platen glass not shown is read to be fractionized into pixels and separated into three primary colors of red (R), green (G) and blue (B) by an optical system moving in a sub-scanning direction. The optical system is an equal-scale magnification type optical system comprised of an exposure lamp 17 for illuminating original D, image sensor 11 disposed in a main scanning direction, a rod lens array 15 and the like. A photoelectric conversion output of image sensor 11 is transmitted to a signal processing portion 100. A white plate 16 of uniform density to be a white reference image is mounted on an original cover (not shown) covering the platen glass.

In image sensor 11, five adhesion type CCD sensor chips 11a–11e are arranged in a zigzag manner successively in a lateral direction (the main scanning direction) and alternately with definite spacings in a longitudinal direction (the sub-scanning direction), as shown in FIG. 4. Because of the definite spacings in the sub-scanning direction, respective output signals from rear CCD sensor chips 11a, 11c and 11e in the sub-scanning direction are delayed. The delay is corrected by setting the timing to apply a line shift pulse signal to each of CCD sensor chips 11a–11e.

In each of CCD sensor chips 11a–11e, a large number of elements 12, each of which is of a 63.5μm (d=1/400 inches) square size, are arranged in a row as shown in FIG. 5. One element 12 corresponds to one pixel made by fractionizing the original image. Each element 12 is divided into three divided regions. A spectral filter is provided in each of the divided regions so that one divided region may receive light of one of the three primary colors R, G and B.

FIG. 6 is a block diagram of signal processing portion 100 of FIG. 3.

In image sensor 11, in order to increase reading speed in the main scanning direction, five CCD sensor chips 11a–11e are driven at a time, so that valid reading pixel signals of 2880 pixels in the total of R, G and B are serially output in turn from each of the CCD sensor chips.

Photoelectric conversion outputs that are serially output at a time (in parallel) from five CCD sensor chips 11a–11e are quantized and converted into image data D17 - 10 of 8 bits (256 gradations) by a digitization circuit 101 including a sample-hold circuit and an A/D converter. Image data D17 - 10 are then applied as an input to a 5-channel composite circuit 102.

Since the photoelectric conversion outputs are proportional to the intensity of reflected light from original D, the value of image data D17 - 10 is, in principle, "255" for a pixel in a lightest shade white part of original D and "0" for a pixel in a darkest shade black part thereof.

5-channel composite circuit 102 once stores image data D17 - 10 into 15 (5×3) first-in first-out memories (FIFO memories) in total for each chip and for each color (R, G, B), then sequentially selects and reads image data D17 - 10 from each chip in a 2-line cycle, and outputs image data D27 - 20 for each color as a serial image signal corresponding to the order of arrangement of pixels (the order of read scanning).

In the following description, denotations "R", "G" and "B" will be appended to the reference characters of image data, if necessary, in order to indicate the correspondence with each of the three primary colors.

A shading correction circuit 103 corrects image data D27 - 20 of each color in accordance with sensitivity differences between any elements 12 and light intensity distribution (unevenness in quantity of light) of exposure lamp 17 in the main scanning direction, as will be described later.

More specifically, a minimum value and a maximum value of the photoelectric conversion outputs from elements 12 are adjusted to be "0 (00H)" and "255 (FFH)" in the A/D conversion by digitization circuit 101. Accordingly, ideally, image data D27 - 20 of a black level corresponding to black pixels is "0", while those of a white level corresponding to white pixels is "255"; however, actually, there is a slight deviation in each level, resulting in differences between any pixels.

Thus, shading correction circuit 103 makes a level adjustment (shading correction) for image data D27 - 20 in units of one line upon reading original D on the basis of reference data XK and XW of one line of black and white levels that are stored prior to the reading of original D, and then outputs corrected data as image data D37 - 30.

A white balance correction circuit 104 adjusts a relative ratio between the respective colors so as to be able to form a copied image with a correct tone, and also logarithmically reduces image data D37 - 30 being a data signal proportional to the intensity of reflected light in view of a range of reading original D and in accordance with a visual characteristic. Then, white balance correction circuit 104 outputs image data D47 - 40 being density data proportional to the density of original D.

A color correction circuit 105 carries out a masking processing for generating density data corresponding to three primary colors of yellow (Y), magenta (M) and cyan (C) of printing toner from the density data corresponding to each color of R, G and B and carries out a UCR processing for generating density data corresponding to black (Bk), as described above. A color edition circuit 106 carries out a processing for three types of editions of a color image such as negative/positive inversion (N/P inversion), color changes and painting.

A variable-scale magnification/edition circuit 107 carries out processing for changing output timing and output sequence or scanning speed in the sub-scanning direction in order to form an enlarged or contracted variable-scale magnified image and an edited image made by movement, mirror inversion or the like, by employing a thinning-out method, an arithmetic operation method, an interpolation method or the like. A gamma correction circuit 108 carries out gamma correction on the basis of the background color and the density gradation of original D.

An MTF correction circuit 109 carries out a smoothing processing for preventing occurrence of Moire fringe and an edge emphasizing processing for eliminating edge loss, thereby to output an image signal VIDEO to the laser printer portion.

A line memory 111 stores image data in a specified processing stage therein. A first CPU (central processing unit) 112 controls respective circuits. A second CPU 113 controls exposure lamp 17, various types of motors and the like.

Figure 1:
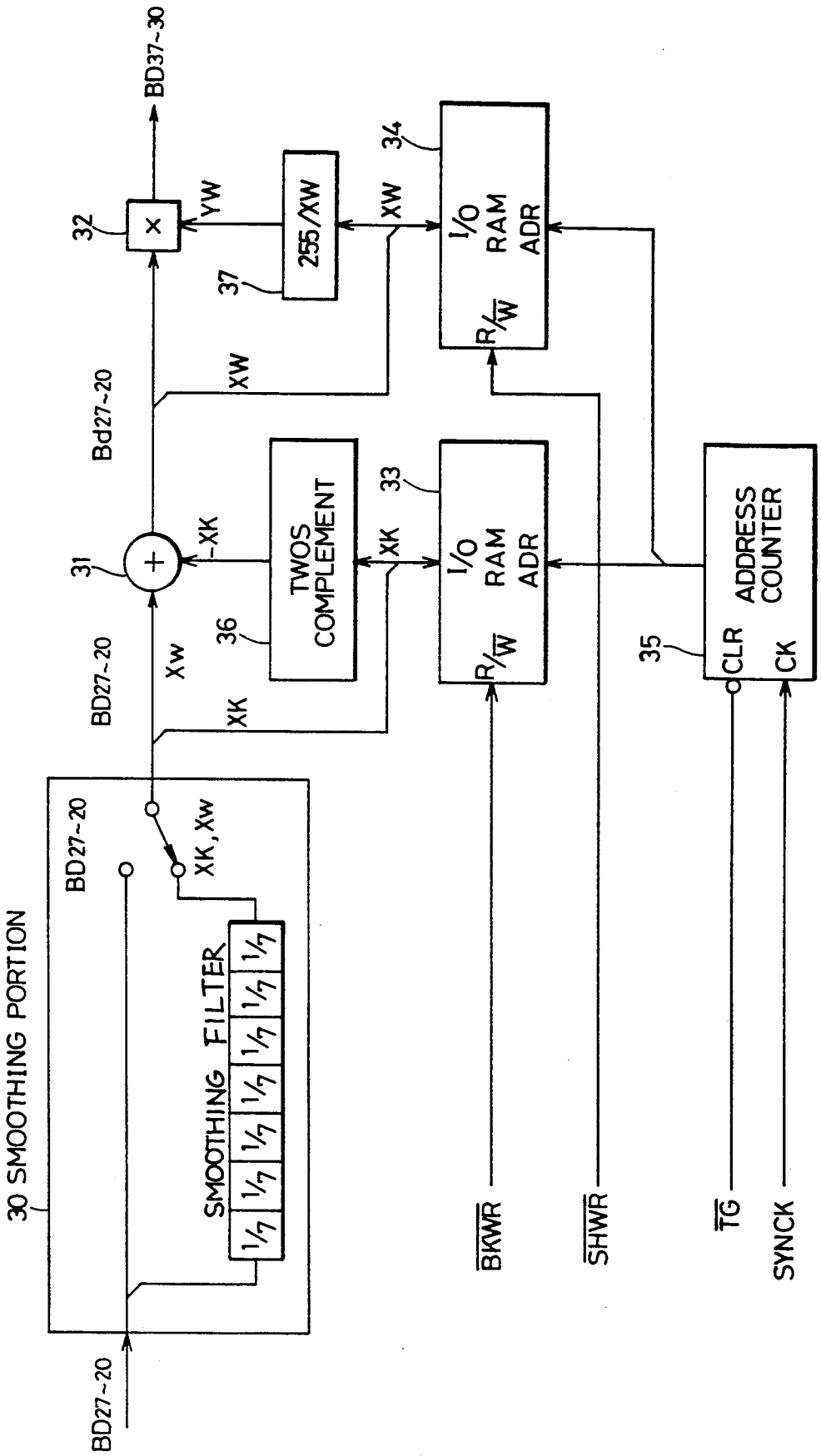
FIG. 1 is a block diagram of a shading correction circuit according to one embodiment of the present invention.

FIG. 1 is a block diagram of shading correction circuit 103.

Shading correction circuit 103 is provided corresponding to each of image data RD27 - 20, GD27 - 20 and BD27 - 20 (of 8 bits for each) of each of three primary colors from 5-channel composite circuit 102. Since the same circuit configuration is applied to each color, FIG. 1 only shows portion corresponding to image data BD27 - 20.

Referring to FIG. 1, shading correction circuit 103 includes a smoothing portion 30 being the feature of the present invention, an adder 31, a multiplier 32, RAMs 33 and 34, an address counter 35, a twos complement unit 36 and an arithmetic unit 37.

As will be described later, smoothing portion 30 directly outputs image data BD27 - 20 when reading original D, while it outputs image data BD27 - 20 subjected to a smoothing processing when storing the above-described reference data XK and XW for correction into RAMs 33 and 34.

Addressing for RAMs 33 and 34 is made by address counter 35. At this time, the address is incremented by an image clock signal SYNCK and initialized by a horizontal synchronizing signal TG for defining a one-line cycle. Image clock signal SYNCK is a signal to be a reference of timing to transmit image data between the above-described respective image processing circuits.

When power is supplied to image reader portion IR, image sensor 11 is first driven with exposure lamp 17 turned off, and image data BD27 - 20 of a black level is applied as an input to smoothing portion 30, in order to obtain reference data XK of a black level.

Smoothing portion 30 subjects image data BD27 - 20 to a smoothing processing which is a so-called moving average processing. More specifically, smoothing portion 30 replaces the value of image data BD27 - 20 of a subject pixel with the average value of image data BD27 - 20 of seven pixels in total combining the subject pixel and six pixels in opposite sides of the subject pixel (three pixels for each side), with respect to image data BD27 - 20 of each of the pixels that are sequentially input in accordance with clock signal SYNCK.

Accordingly, even if the value of image data BD27 - 20 corresponding to one pixel is far away from its inherent value due to occurrence of external noise, the image data BD27 - 20 is eventually corrected by reference to image data BD27 - 20 of adjacent pixels and made close to its inherent value. This results in stable reference data XK less influenced by the external noise.

At that time, in RAM 33, a write enable signal $\overline{BKWR}$ added from CPU 112 is made active (active low), and reference data XK of a black level of one line output from smoothing portion 30 is sequentially stored therein.

Then, in order to obtain reference data Xw of a white level, exposure lamp 17 is lighted on, so that image data BD27 - 20 of a white level provided by white plate 16 (see FIG. 3) read by image sensor 11 is applied as an input to smoothing portion 30.

At that time also, smoothing portion 30 subjects image data BD27 - 20 to a smoothing processing, thereby to output resultant reference data Xw obtained by the smoothing processing. That is, reference data Xw is also stable data less influenced by external noise. This reference data Xw is applied as an input to adder 31.

In RAM 33, write enable signal $\overline{BKWR}$ is made inactive, and reference data XK stored previously is sequentially read. The read reference data XK is converted into negative data multiplied by $-1$ by twos complement unit 36. Adder 31 then adds the negative data and the reference data Xw and outputs the result of the addition as reference data XW of a white level. In other words, reference data XW is data that is obtained by subtracting reference data XK from reference data Xw and by correcting dispersion of a black level between any pixels.

Reference data XW thus obtained are stored on a pixel-by-pixel basis in turn from its heading address into RAM 34 that is brought into a writing state by a write enable signal $\overline{SHWR}$, whereby preparation for reading original D is completed.

In reading original D, smoothing portion 30 directly outputs image data BD27 - 20 (with its value unchanged). At that time, both write enable signals $\overline{BKWR}$ and $\overline{SHWR}$ are rendered inactive, so that reference data XK and XW are read from RAMs 33 and 34.

Image data BD27 - 20 first undergoes a correction of a black level by reference data XK in adder 31, and corrected image data Bd27 - 20 is applied as an input to multiplier 32.

Reference data XW is converted into correction coefficient data YW of the value obtained by multiplying a reciprocal number of reference data XW by 255 by arithmetic unit 37.

Multiplier 32 multiplies image data Bd27 - 20 and correction coefficient data YW together, whereby shading correction for image data BD27 - 20 is completed.

Figure 2:
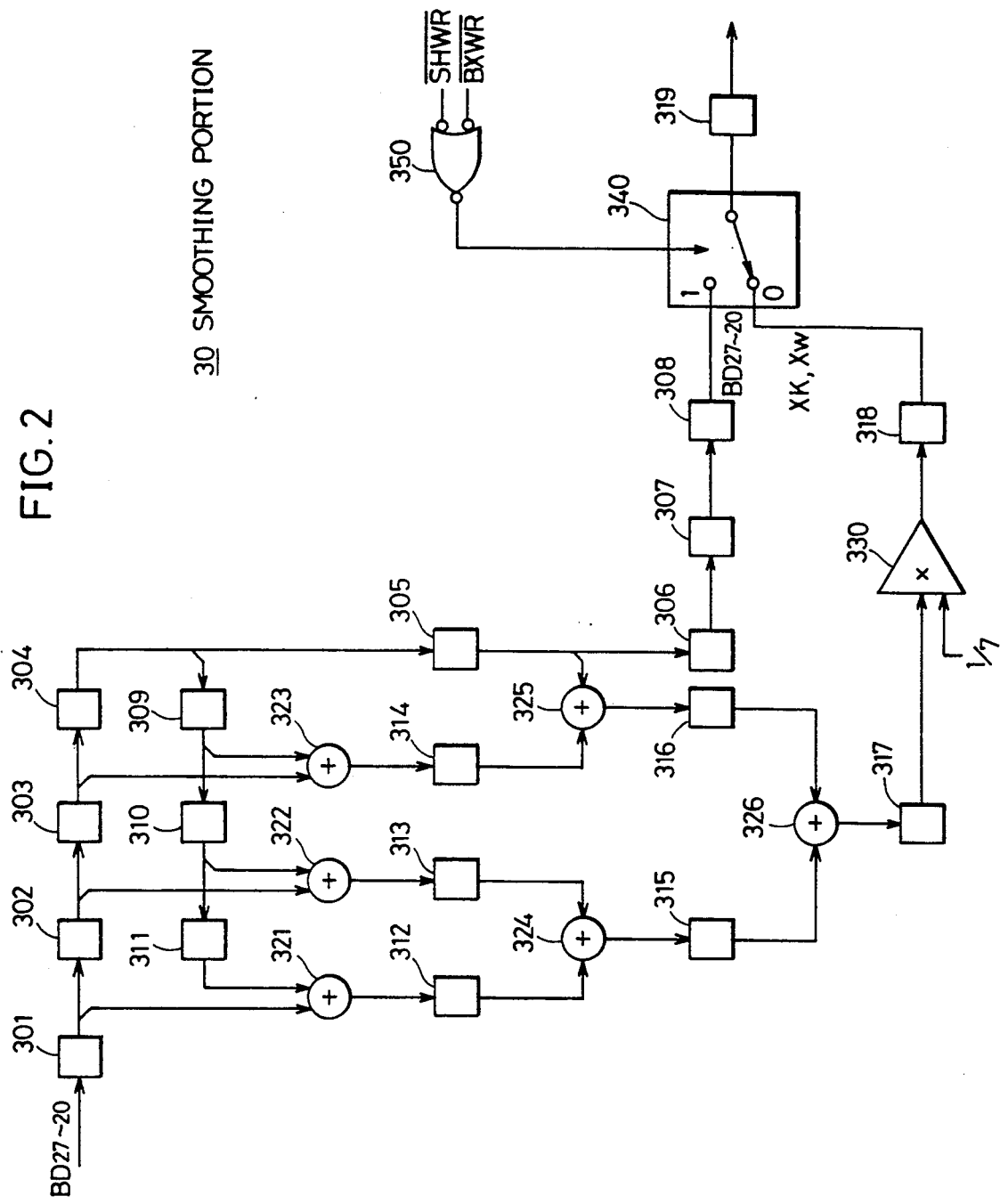
FIG. 2 is a circuit diagram of a smoothing portion of FIG. 1.

FIG. 2 is a circuit diagram of smoothing portion 30.

Smoothing portion 30 includes delay elements 301–319 formed of a flipflop of a predetermined number of bits for delaying data of one pixel in response to a clock signal SYNCK, adders 321–326 for adding image data BD27 - 20 of seven pixels, a multiplier 330 for multiplying the total of image data BD27 - 20 of seven pixels by 1/7 thereby calculating an average value, an output selector 340 and an NOR circuit 350.

An output of NOR circuit 350 attains a logic low level when at least one of write enable signals $\overline{BKWR}$ and $\overline{SHWR}$ is active. At this time, output selector 340 selects as an output, data obtained by smoothing image data BD27 - 20.

FIG. 7 is a block diagram of a shading correction circuit 103a according to another embodiment of the present invention. In FIG. 7, constituent elements having the same functions as those of FIG. 1 are denoted with the same reference characters.

Shading correction circuit 103a is provided in a signal processing portion 100 in the case where original D is read by a so-called reduction type image sensor (hereinafter referred to as "image sensor 11S") in place of equal-scale magnification type image sensor 11 shown in FIG. 4.

Image sensor 11S can read original D at a similar resolution to that of image sensor 11 by using one CCD sensor chip. However, in order to increase reading speed, image sensor 11S is driven so as to read pixels arranged in the main scanning direction by separating these pixels into pixels of odd numbers (odd number pixels) and pixels of even numbers (even number pixels). Thus, although there is no difference in sensitivity between CCD sensor chips which is viewed in image sensor 11, nonuniformity of photoelectric conversion outputs between the odd number pixels and the even number pixels, particularly offset (the difference in black level) frequently occurs.

Thus, shading correction circuit 103a includes a smoothing portion 40 for carrying out a moving average processing by separating the pixels into odd number pixels and even number pixels. Shading correction circuit 103a carries out a correction of a black level on the basis of reference data XK1 corresponding to the odd number pixels and reference data XK2 corresponding to the even number pixels.

Reference data XK1 and XK2 are stored as follows.

Like the foregoing example, image sensor 11S is driven with exposure lamp 17 lighted off, and image data BD17 - 10 of a black level is applied from digitization circuit 101 to smoothing portion 40.

Smoothing portion 40 subjects image data BD17 - 10 of each pixel to such a processing as to replace the value of image data BD17 - 10 of a subject pixel by the average value of image data BD17 - 10 of seven pixels in total combining the subject pixel and alternate six pixels on opposite sides of the subject pixel (alternate three pixels on each side). More specifically, if the subject pixel is an odd number pixel, another adjacent odd number pixel is selected as an object to be averaged. If the subject pixel is an even number pixel, another adjacent even number pixel is selected as an object to be averaged.

An output of smoothing portion 40 is once stored in the above-described line memory 111. A CPU 112 reads data of one line of line memory 111, then evaluates the respective average values of the respective data of the odd number pixel and the even number pixel, and stores the result of the evaluation as reference data XK1 and XK2 into a register 43.

After reference data XK1 and XK2 are obtained as described above, a white plate 16 is read.

Smoothing portion 40 applies data Xwa, which is obtained by subjecting image data BD17 - 10 of a white level to a moving average processing, to an adder 31. A selector 46 selects reference data XK1 and XK2 applied from register 43 in accordance with addresses ADR of an address counter 35 and applies the selected reference data to adder 31. Accordingly, in adder 31, data Xwa is corrected on the basis of reference data XK1 with respect to odd number pixels, while data Xwa is corrected on the basis of reference data XK2 with respect to even number pixels.

Reference data XWa provided by subjecting data Xwa to a correction of a black level is converted into correction coefficient data YWa by an arithmetic unit 37. Correction coefficient data YWa is stored on a pixel-by-pixel basis in turn from its heading address into RAM 34. Preparation for reading original D is thus completed.

In reading original D, smoothing portion 40 directly outputs image data BD17 - 10 without a data processing. At this time, a write enable signal $\overline{SHWR}$ is made inactive, so that correction coefficient data YWa is read from RAM 34.

Image data BD17 - 10 is first subjected to a correction of a black level by reference data XK1 and XK2 in adder 31, and corrected image data BD17 - 10 is applied as an input to a multiplier 32.

Multiplier 32 multiplies image data BD17 - 10 and correction coefficient data YWa together, whereby shading correction for image data BD17 - 10 is completed.

FIG. 8 is a circuit diagram of smoothing portion 40 of FIG. 7.

Smoothing portion 40 includes delay elements 401 - 424 for delaying data of one pixel, adders 431 - 436 for adding image data BD17 - 10 of alternate seven pixels in total, a multiplier 440 for multiplying the total of image data BD17 - 10 of seven pixels by 1/7, thereby to output an average value, and an output selector 450.

When write enable signal $\overline{SHWR}$ is active, output selector 450 selects as output data, data obtained by smoothing image data BD17 - 10.

FIG. 9 is a block diagram of a line memory peripheral portion 111S.

Line memory peripheral portion 111S includes the above-described line memory 111, a selector 121 for selecting data to be stored, an address counter 123, a selector 122 for selecting an address from address counter 123 or an address from CPU112 for addressing line memory 111, a bus gate circuit 124 for connecting line memory 111 to a CPU data bus in response to an enable signal $\overline{LMCS}$, and the like.

According to the foregoing embodiment, since a white level correction on the basis of reference data XW and XWa is carried out after the black level correction, a highly accurate shading correction can be made.

According to the foregoing embodiment, since the black level correction on the basis of reference data XK1 and XK2 produced by employing line memory 111 is carried out in shading correction circuit 103a, an RAM that stores reference data of one line for the black level correction becomes unnecessary, thereby enabling a reduction in the cost of the circuit.

According to the foregoing embodiment, since the number of object pixels for the moving average is set to 7 in smoothing portion 30, such shading correction is available that corresponds to nonuniformity of converging light, generated in the cycle of approximately 10–20 pixels and specific to an erecting equal-scale magnification type lens such as rod lens array 15 or a selfoc lens array, and influence caused by external noise can be reduced.

In the foregoing embodiment, the circuit configuration of smoothing portion 30 or 40 can be altered, if necessary, dependently on the format of data transmission or the like.

In accordance with the present invention, the influence of external noise exerted on the quality of an image can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus, comprising:
   image reading means including a plurality of image reading elements;
   reference image reading means for reading a reference image by using said image reading means;
   smoothing means for smoothing reference image data read by said reference image reading means;
   processing means for processing said smoothed reference image data;
   original image reading means for reading an original image by using said image reading means;
   correction means for subjecting original data read by said original image reading means and the reference image data processed by said processing means to a predetermined arithmetic operation, thereby correcting the original data; and
   illuminating means for illuminating an original, wherein
   said reference image reading means includes first means for operating said image reading means with said illuminating means turned off, and second means for reading a white plate by using said image reading means;
   wherein said processing means includes means for subtracting image data obtained by said first means from image data obtained by second means.

2. An image reading apparatus, comprising:
   image reading means including a plurality of image reading elements;
   switching means for switching between a first path for subjecting data read by said image reading means to a smoothing processing and a second path for not subjecting the read data to said smoothing processing, thereby to transmit the data therethrough;
   first control means when reading a reference image by using said image reading means, for switching the path to said first path by said switching means, thereby subjecting the read reference image data to said smoothing processing;
   storage means for storing said smoothed reference image data;
   second control means when reading an original image by using said image reading means, for switching the path to said second path by said switching means, thereby not subjecting the read original image data to said smoothing processing; and
   original data correcting means for correcting the original data not subjected to said smoothing processing on the basis of the reference image data stored in said storage means.

3. The image reading apparatus according to claim 2, wherein
   said storage means includes a line memory.

* * * * *